United States Patent
Rofougaran et al.

(10) Patent No.: US 7,941,179 B2
(45) Date of Patent: May 10, 2011

(54) SYSTEM AND METHOD PROVIDING CONCURRENT MULTIMODE COMMUNICATION

(75) Inventors: Ahmadreza Rofougaran, Newport Coast, CA (US); Arya Behzad, Paseo de las Cumbres, CA (US)

(73) Assignee: Broadcom Corporation, Irvine, CA (US)

( * ) Notice: Subject to any disclaimer, the term of this patent is extended or adjusted under 35 U.S.C. 154(b) by 1229 days.

(21) Appl. No.: 11/376,532

(22) Filed: Mar. 15, 2006

(65) Prior Publication Data

US 2007/0142002 A1    Jun. 21, 2007

Related U.S. Application Data

(60) Provisional application No. 60/752,559, filed on Dec. 21, 2005.

(51) Int. Cl.
*H04M 1/00*    (2006.01)
(52) U.S. Cl. ....... 455/553.1; 455/59; 455/60; 455/127.4
(58) Field of Classification Search .................... 455/59, 455/60, 61, 63.1, 114.2, 127.4, 553.1
See application file for complete search history.

(56) References Cited

U.S. PATENT DOCUMENTS

| | | | |
|---|---|---|---|
| 7,110,421 B2 * | 9/2006 | Feinberg | 370/473 |
| 7,277,679 B1 * | 10/2007 | Barratt et al. | 455/101 |
| 2003/0114168 A1 * | 6/2003 | Shi et al. | 455/456 |

FOREIGN PATENT DOCUMENTS

| | | |
|---|---|---|
| EP | 1119137 | 7/2001 |
| EP | 1207654 | 5/2002 |
| WO | WO 02/01807 | 1/2002 |
| WO | WO 2005/088849 * | 9/2005 |

OTHER PUBLICATIONS

European Search Report corresponding to European Patent Application Serial No. 06017285.5-2412, dated Mar. 6, 2009.

* cited by examiner

*Primary Examiner* — Tuan H Nguyen
(74) *Attorney, Agent, or Firm* — McAndrews, Held & Malloy, Ltd.

(57) ABSTRACT

A system and method providing concurrent multimode communication through multimode signal multiplexing. Various aspects of the present invention may comprise, during a first time period, transmitting a first portion of a first communication in a first communication mode in a serial wireless transmission stream. During a second time period after the first time period, a first portion of a second communication may be transmitted in a second communication mode in the serial wireless transmission stream. Also, during a third time period after the second time period, a second portion of the first communication may be transmitted in the first communication mode in the serial wireless transmission stream. In an exemplary scenario, prior to communicating various communications, transmission time may be allocated between the first and second communication modes. In another exemplary scenario, transmission may be switched between a plurality of communication modes in response to detected communication conditions.

34 Claims, 8 Drawing Sheets

SYSTEM AND METHOD PROVIDING CONCURRENT MULTIMODE COMMUNICATION

CROSS-REFERENCE TO RELATED APPLICATIONS/INCORPORATION BY REFERENCE

This patent application is related to and claims priority from provisional patent application Ser. No. 60/752,559 filed Dec. 21, 2005, and titled "SYSTEM AND METHOD PROVIDING CONCURRENT MULTIMODE COMMUNICATION," the contents of which are hereby incorporated herein by reference in their entirety. Also, U.S. patent application Ser. No. 11/298,371, filed Dec. 7, 2005, entitled "MULTIMODE COMMUNICATION DEVICE WITH SHARED SIGNAL PATH PROGRAMMABLE FILTER," is hereby incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Communication devices (e.g., mobile communication devices) are continually increasing in popularity. Such communication devices include, for example and without limitation, cellular phones, paging devices, portable email devices, and personal digital assistants. Mobile communication devices, for example, provide the user with the capability to conduct communications while moving through a variety of environments.

Communication devices may operate in accordance with multiple communication modes. For example a mobile wireless communication device may be adapted to operate in a cellular communication mode and a wireless computer network communication mode. Such multimode communication devices may utilize respective radio configurations for each communication mode. For example, various communication modes may correspond to different respective radios and/or different communication protocols.

Various communication modes may potentially operate in common frequency bands. Thus, the potential exists for transmissions (e.g., simultaneous transmissions) in various communication modes to interfere with each other. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method providing concurrent multimode communication through multimode signal multiplexing, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
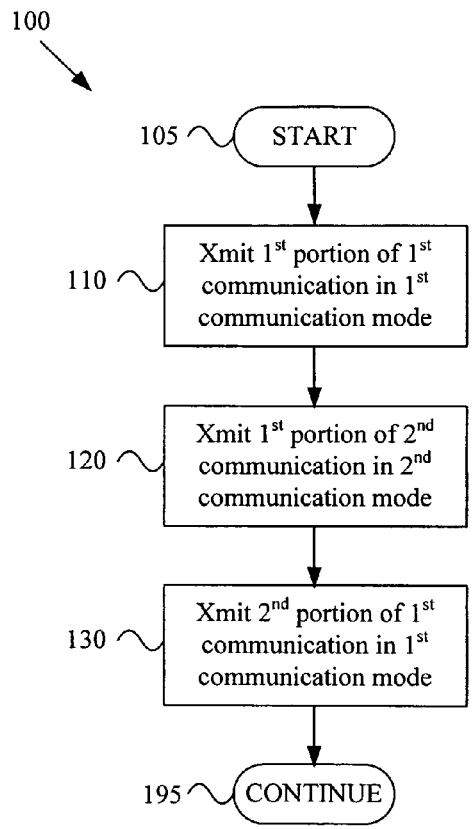
FIG. 1 is a diagram showing a first non-limiting exemplary method for providing concurrent multimode communication, in accordance with various aspects of the present invention.

FIG. 1 is a diagram showing a first non-limiting exemplary method 100 for providing concurrent multimode communication, in accordance with various aspects of the present invention. A communication system (or device) implementing the method 100 may comprise characteristics of any of a variety of communication systems/devices (e.g., multimode wireless communication devices). For example and without limitation, the communication system may comprise characteristics of any of a variety of mobile wireless communication devices (e.g., cellular phones, paging devices, portable email devices, etc.). Also for example, the communication system may comprise characteristics of fixed communication systems or devices (e.g., network access points, base stations, satellites, wireless routers, set top boxes, etc.). Further for example, the communication system may comprise characteristics of a variety of electronic devices with wireless communication capability (e.g., televisions, music players, cameras, remote controls, personal digital assistants, handheld computers, gaming devices, etc.). Accordingly, the scope of various aspects of the present invention should not be limited by characteristics of particular communication systems or devices.

The following discussion will, at times, refer to various communication modes. A multimode communication device may, for example, be adapted to communicate in a plurality of such communication modes. For the following discussion, a communication mode may generally be considered to coincide with communication utilizing a particular communication protocol or standard. A non-limiting list of exemplary communication protocols includes various cellular communication protocols (e.g., GSM, GPRS, EDGE, CDMA, WCDMA, TDMA, PDC, etc.), various wireless networking protocols or standards, including WLAN, WMAN, WPAN and WWAN (e.g., IEEE 802.11, Bluetooth, IEEE 802.15, UWB, IEEE 802.16, IEEE 802.20, Zigbee, any WiFi protocol, etc.), various television communication standards, etc. The scope of various aspects of the present invention should not be limited by characteristics of particular communication modes or protocols, whether standard or proprietary.

The exemplary method 100 may begin executing at step 105. The exemplary method 100 (and all methods discussed herein) may begin executing for any of a variety of reasons. For example and without limitation, the exemplary method 100 may begin executing in response to a user input, a power-up condition or a reset condition. Also for example, the exemplary method 100 may begin executing in response to a detected event (e.g., a timer expiration, detected signal, detected network access point, system command, etc.). Further for example, the exemplary method 100 may begin executing in response to a determination to communicate in a plurality of communication modes concurrently. Still further for example, the exemplary method 100 may begin executing in response to a determination to utilize bandwidth in a plurality of communication systems for a single communication or multiple communications. Accordingly, the scope of various aspects of the present invention should not be limited by characteristics of any particular initiating cause or condition.

The exemplary method 100 may, at step 110, comprise (e.g., during a first time period) transmitting a first portion of a first communication in a first communication mode (e.g., in a serial wireless transmission stream). The first communication may comprise characteristics of any of a variety of types of communications. For example and without limitation, the first communication may comprise characteristics of a voice communication, video communication, pictorial communication, textual communication, unicast communication, multicast communication, broadcast communication, one-way communication, two-way communication, etc.

Step 110 may comprise transmitting the first portion of the first communication in the first communication mode in any of a variety of manners. For example and without limitation, step 110 may comprise communicating the first communication through any of a variety of communication media (e.g., the RF wireless medium or optical medium). Step 110 may, for example, comprise utilizing radio circuitry dedicated to communicating in the first communication mode and/or radio circuitry shared between a plurality of communication modes.

Figure 2:
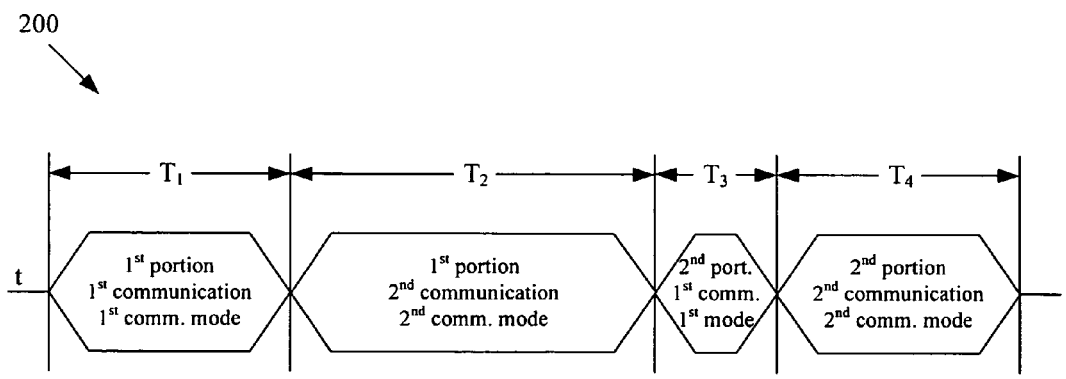
FIG. 2 is a diagram illustrating a first non-limiting exemplary multiplexed signal sequence, in accordance with various aspects of the present invention.

Referring briefly to FIG. 2, the time period $T_1$ may correspond to communication of the first portion of the first communication in the first communication mode.

The exemplary method 100 may, at step 120, comprise, during a second time period after the first time period, transmitting a first portion of a second communication in a second communication mode (e.g., different from the first communication mode). For example, step 120 may comprise stopping transmission of the first communication prior to transmitting the first portion of the second communication (e.g., in the same serial wireless transmission stream as step 110). As with the first communication, the second communication may comprise characteristics of any of a variety of types of communications. The second communication may, for example, be independent of the first communication. Alternatively for example, the second communication may correspond to a second portion of an aggregate communication, and the first communication may correspond to a first portion of the aggregate communication.

As with step 110, step 120 may comprise transmitting the first portion of the second communication in the second communication mode in any of a variety of manners. For example and without limitation, step 120 may comprise communicating the first communication through any of a variety of communication media (e.g., the RF wireless medium or non-tethered optical medium). Step 120 may, for example, comprise utilizing radio circuitry dedicated to communicating in the second communication mode and/or radio circuitry shared between a plurality of communication modes (e.g., shared between the first and second communication modes). As a non-limiting example, step 110 may comprise transmitting in the first communication mode utilizing a first set of radio components, and step 120 may comprise transmitting in the second communication mode utilizing a second set of radio components, at least a portion of which is identical to the first set of radio components.

Referring briefly to FIG. 2, the time period $T_2$ may correspond to communication of the first portion of the second communication in the second communication mode. Though the first time period $T_1$ and the second time period $T_2$ are illustrated being temporally adjacent, such a temporally adjacent relationship is not necessary. For example, there may be a time gap between $T_1$ and $T_2$.

The exemplary method 100 may, at step 130, comprise, during a third time period after the second time period, transmitting a second portion of the first communication in the first communication mode (e.g., in the same serial wireless transmission stream as steps 110 and 120). For example, step 130 may comprise stopping transmission of the second communication prior to transmitting the second portion of the first communication. Step 130 may comprise transmitting the second portion of the first communication in the first communication mode in any of a variety of manners. For example and without limitation, step 130 may comprise communicating the first communication through any of a variety of communication media (e.g., the RF wireless medium or non-tethered optical medium). Step 130 may, for example, comprise utilizing radio circuitry dedicated to communicating in the first communication mode and/or radio circuitry shared between a plurality of communication modes (e.g., shared between the first and second communication modes).

Referring briefly to FIG. 2, the time period $T_3$ may correspond to communication of the second portion of the first communication in the first communication mode. Though the second time period $T_2$ and the third time period $T_3$ are illustrated being temporally adjacent, such a temporally adjacent relationship is not necessary.

In a non-limiting exemplary scenario, the exemplary method 100 may comprise executing steps 110-130 in a manner that simultaneously satisfies communication requirements (e.g., timing and/or information constraints) associated with the first and second communication protocols. For example, an entity communicating with a communication device implementing the method 100 might receive no indication that the communication device is conducting a plurality of communications in a plurality of communication modes concurrently.

The exemplary method 100 may, at step 195, comprise performing any of a variety of continued processing. Such continued processing may, for example and without limitation, comprise performing additional communication (e.g., in the first or second communication modes or an $N^{th}$ communication mode). Referring briefly to FIG. 2, the time period $T_4$ may correspond to communication of a second portion of the second communication in the second communication mode.

Step 195 may also, for example, comprise performing any of a variety of communication-related activities (e.g., activities associated with user interface, secure communication, power management, media access scheduling, responding to real-time communication conditions, radio configuration and/or calibration, etc.). Step 195 may share any or all characteristics with any similarly labeled step of any of the exemplary methods discussed herein.

Figure 3:
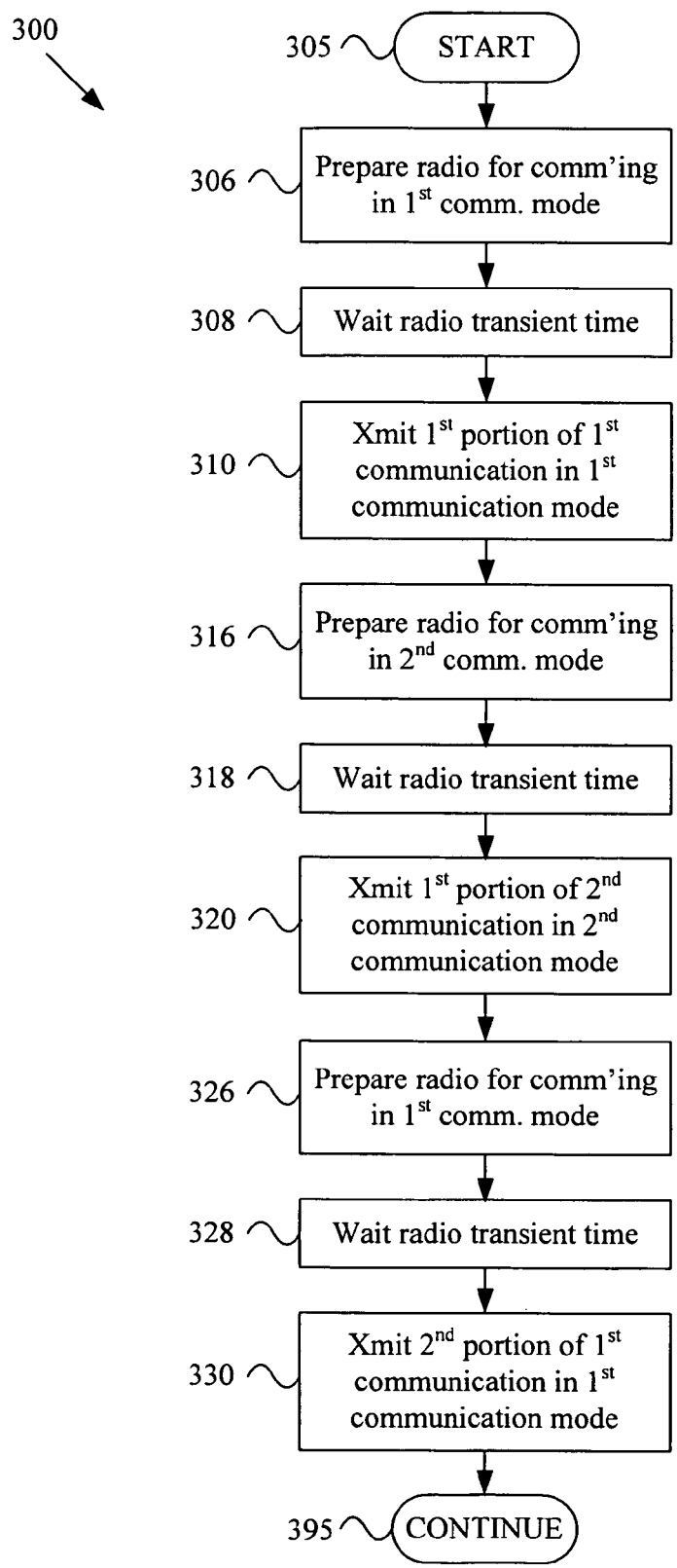
FIG. 3 is a diagram showing a second non-limiting exemplary method for providing concurrent multimode communication, in accordance with various aspects of the present invention.

FIG. 3 is a diagram showing a second non-limiting exemplary method 300 for providing concurrent multimode communication, in accordance with various aspects of the present invention. The exemplary method 300 may, for example and without limitation, share any or all characteristics with the exemplary method 100 illustrated in FIG. 1 and discussed previously.

As mentioned previously with regard to FIG. 1, communication may be performed in a plurality of communication modes utilizing a shared radio or various shared radio components. The exemplary method 300 is presented to illustrate various non-limiting steps associated with communicating utilizing such a shared radio or shared radio components. As a non-limiting example of such programmable (or configurable) radio circuitry, refer to U.S. patent application Ser. No. 11/298,371, filed Dec. 7, 2005, entitled "MULTIMODE COMMUNICATION DEVICE WITH SHARED SIGNAL PATH PROGRAMMABLE FILTER,", which is hereby incorporated herein by reference in its entirety.

The exemplary method 300 may, at step 306, comprise preparing a radio of the communication system for communicating in the first communication mode. For example, step 306 may comprise configuring a programmable radio to transmit in the first communication mode. For example, step 306 may comprise directing a programmable radio to change configuration to a configuration corresponding to communication in the first communication mode.

Step 306 may also, for example, comprise preparing a radio of the communication system by, at least in part, waking sleeping components of the communication system that are associated with communicating in the first communication mode. Step 306 may additionally, for example, comprise placing one or more components of the communication system (e.g., components associated with a previous communication mode different from the first communication mode) in a sleep state.

The exemplary method 300 may, at step 308, comprise waiting a transient time period (e.g., after programming the programmable radio or directing the programmable radio to change configuration). Such waiting may, for example, ensure that various switching and other devices (e.g., filters, frequency generators, codecs, etc.) have stabilized or converged to the desired state before utilizing the radio.

The exemplary method 300 may, at step 310, comprise (e.g., during a first time period) transmitting a first portion of a first communication in the first communication mode (e.g., in a serial wireless transmission stream). Steps 306-310 may, for example and without limitation, share any or all characteristics with step 110 of the exemplary method 100 illustrated in FIG. 1 and discussed previously.

Figure 4:
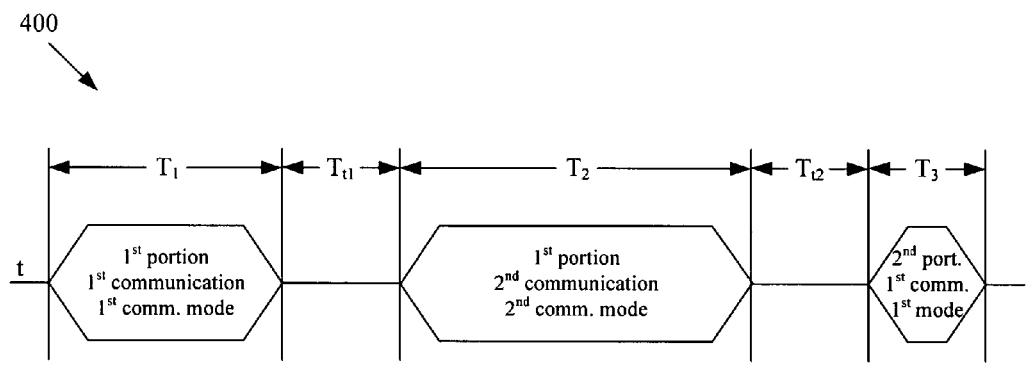
FIG. 4 is a diagram illustrating a second non-limiting exemplary multiplexed signal sequence, in accordance with various aspects of the present invention.

Referring briefly to FIG. 4, the time period $T_1$ may correspond to communication of the first portion of the first communication in the first communication mode.

The exemplary method 300 may, at step 316, comprise preparing a radio of the communication system for communicating in the second communication mode. The radio may, for example, comprise the same radio (or a portion thereof) prepared at step 306 and utilized at step 310. For example, step 316 may comprise configuring a programmable radio to transmit in the second communication mode. For example, step 316 may comprise directing a programmable radio to change configuration to a configuration corresponding to communication in the second communication mode.

Step 316 may also, for example, comprise preparing a radio of the communication system by, at least in part, waking sleeping components of the communication system that are associated with communicating in the second communication mode. Step 316 may additionally, for example, comprise placing one or more components of the communication system (e.g., various components associated with the first communication mode and not the second communication mode) in a sleep state.

The exemplary method 300 may, at step 318, comprise waiting a transient time period (e.g., after programming the programmable radio or directing the programmable radio to change configuration). Such waiting may, for example, ensure that various switching and other devices (e.g., filters, frequency generators, codecs, etc.) have stabilized or converged to the desired state before utilizing the radio. The transient time period may, for example, be the same transient time period associated with step 308 or may be different (e.g., depending on settling or convergence characteristics of programmable or configurable circuitry).

Referring briefly to FIG. 4, the transient time period $T_{t1}$ may correspond to waiting a transient period prior to communicating in the second communication mode. Though the first time period $T_1$ and the transient time period $T_{t1}$ are illustrated being temporally adjacent, such a temporally adjacent relationship is not necessary.

The exemplary method 300 may, at step 320, comprise (e.g., during a second time period) transmitting a first portion of a second communication in the second communication mode (e.g., in the same serial wireless transmission stream as step 310). Steps 316-320 may, for example and without limitation, share any or all characteristics with step 120 of the exemplary method 100 illustrated in FIG. 1 and discussed previously. For example, in a non-limiting exemplary scenario, step 310 may comprise transmitting in the first communication mode utilizing a first set of radio components, and step 320 may comprise transmitting in the second communication mode utilizing a second set of radio components, at least a portion of which is different from the first set of radio components.

Referring briefly to FIG. 4, the time period $T_2$ may correspond to communication of the first portion of the second communication in the second communication mode. Though the transient time period $T_{t1}$ and the second time period $T_2$ are illustrated being temporally adjacent, such a temporally adjacent relationship is not necessary.

The exemplary method 300 may, at step 326, comprise preparing a radio of the communication system for communicating in the first communication mode. The exemplary method 300 may, at step 328, comprise waiting a transient time period (e.g., after programming the programmable radio or directing the programmable radio to change configuration)

. The exemplary method 300 may, at step 330, comprise (e.g., during a third time period) transmitting a second portion of the first communication in the first communication mode (e.g., in the same serial wireless transmission stream as steps 310 and 320). Steps 326-330 may, for example and without limitation, share any or all characteristics with step 130 of the exemplary method 100 illustrated in FIG. 1 and discussed previously and/or with steps 306-310.

Referring briefly to FIG. 4, the transient time period $T_{t2}$ may correspond to waiting a transient period prior to resuming communicating in the first communication mode. Also, the time period $T_3$ may correspond to communication of the second portion of the first communication in the first communication mode. Though the transient time period $T_{t2}$ and the time period $T_3$ are illustrated being temporally adjacent, such a temporally adjacent relationship is not necessary.

Figure 5:
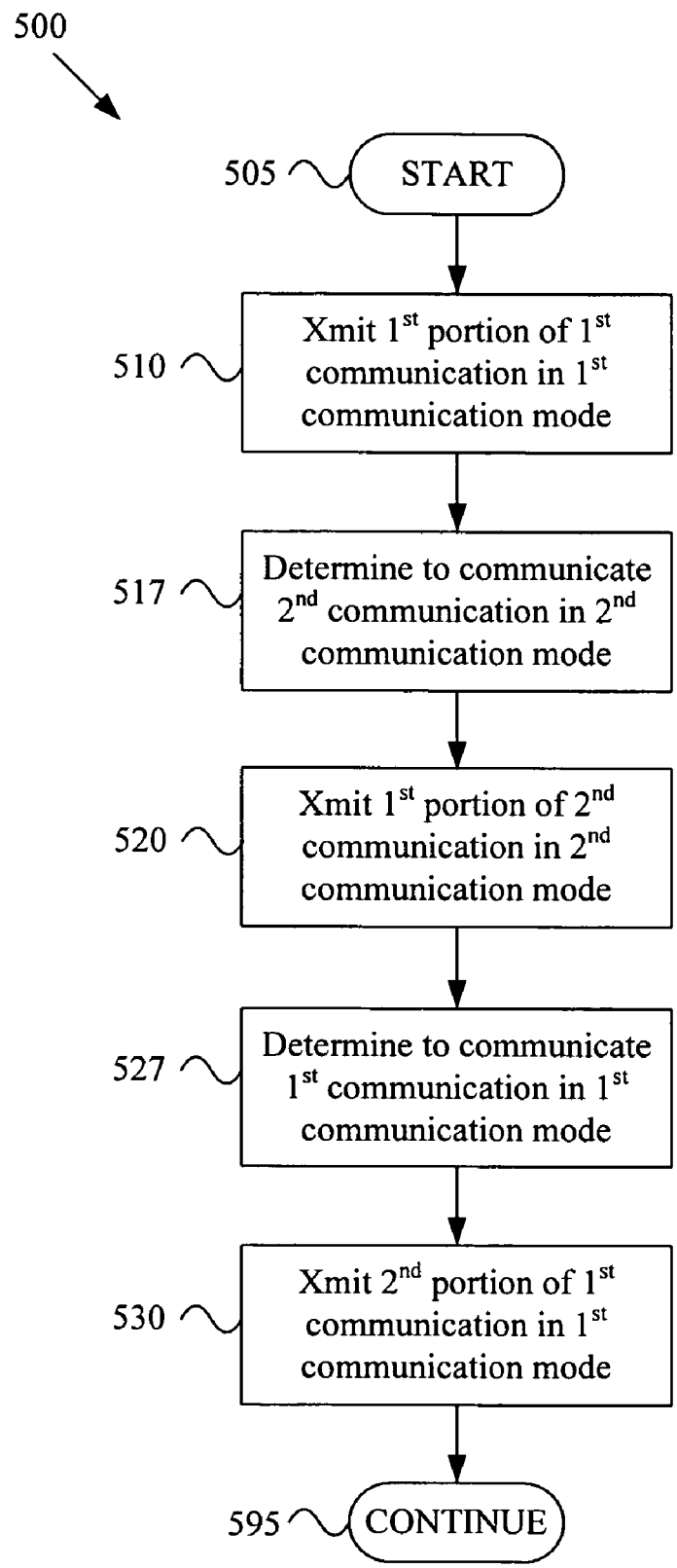
FIG. 5 is a diagram showing a third non-limiting exemplary method for providing concurrent multimode communication, in accordance with various aspects of the present invention.

FIG. 5 is a diagram showing a third non-limiting exemplary method 500 for providing concurrent multimode communication, in accordance with various aspects of the present invention. The exemplary method 500 may share any or all characteristics with the exemplary methods 100 and 300 illustrated in FIGS. 1 and 3 and discussed previously.

The exemplary method 500 may, at step 510, comprise (e.g., during a first time period) transmitting a first portion of a first communication in a first communication mode (e.g., in a serial wireless transmission stream). Step 510 may, for example, share any or all characteristics with steps 110 and 306-310 discussed previously.

The exemplary method 500 may, at step 517, comprise determining to communicate a second communication in a second communication mode. Step 517 may, for example, comprise determining to communicate the second communication concurrently with the first communication (e.g., in the same serial wireless transmission stream as the first communication). Such concurrent communication may, for example and without limitation, comprise simultaneously meeting communication requirements (e.g., timing and/or informational requirements) of the first and second communication modes. Step 517 may comprise making such determination (s) in response to any of a variety of events or conditions, non-limiting examples of which will now be presented.

In a non-limiting exemplary scenario, step 517 may comprise detecting a user interface event and determining to transmit at least a first portion of a second communication in the second communication mode in response to the detected user interface event. For example, such user interface events may comprise a user expressing a desire to perform the second communication (e.g., concurrently with the first communication).

In another exemplary scenario, step 517 may comprise receiving a signal from a communication network (e.g., an access point thereof) associated with the second communication mode and determining to transmit at least a first portion of a second communication in the second communication mode in response to the received signal. The signal may, for example, comprise a polling message directed to the communication system implementing the method 500. Also for example, the signal may comprise a beacon message or a response to a beacon message.

In another exemplary scenario, step 517 may comprise detecting expiration of a timer and determining to transmit at least a first portion of a second communication in response to the detected timer expiration. The timer may be associated with any of a variety of communication-related activities. For example, the timer may be associated with any of a variety of timeout events associated with carrier sensing. Also for example, the timer may be associated with a predetermined transmission schedule. Further for example, the timer may be associated with waiting a transient time before transmitting. Still further for example, the timer may be associated with expiration of a maximum time to wait for an event to occur.

In a further exemplary scenario, step 517 may comprise detecting availability of a communication network associated with the second communication mode and determining to communicate at least a first portion of a second communication based on the network detection. Step 517 may comprise detecting availability of the network in any of a variety of manners, including without limitation, detecting a beacon signal, detecting a response to a signal, detecting a particular type of signal associated with the network, determining geographical location that is associated with the network, receiving a user input, etc.

In another exemplary scenario, step 517 may comprise detecting that a carrier associated with communicating in the second communication mode is available and determining to communicate at least a first portion of a second communication based on the carrier detection. Step 517 may comprise determining that the carrier is available in any of a variety of manners. For example, step 517 may comprise determining that it is time for a pre-allocated timeslot (or other type of channel) to be available. Also for example, step 517 may comprise performing contention-based carrier detection (e.g., CSMA, CSMA/CD, CSMA/CA, etc.).

In still another exemplary scenario, step 517 may comprise determining noise conditions associated with one or more communication modes and determining to communicate at least a first portion of a second communication based on the noise determination. As a non-limiting example, step 517 may comprise determining that the present noise environment favors communicating in the second communication mode over communicating in the first communication mode and determining to communicate at least a first portion of a second communication in the second communication mode based on such determination. For example, a first communication mode may utilize direct sequence spread spectrum, and a second communication mode may utilize frequency hopped spread spectrum, resulting in the first and second communication modes responding differently to different types and/or amounts of noise. Also for example, a first communication mode may utilize a particular transmission power, and a second communication mode may utilize another particular transmission power, resulting in the first and second communication modes being able to overcome particular amounts of noise differently.

In yet another exemplary scenario, step 517 may comprise determining one or more power consumption parameters (e.g., levels of power consumption associated with particular communication modes and/or levels of power available from a power source) and determining to communicate at least a first portion of a second communication based on the power consumption and/or supply determination. In a non-limiting example, step 517 may comprise favoring transmission in the second communication mode over transmission in the first communication mode due to power consumption/supply characteristics.

In a further exemplary scenario, step 517 may comprise determining quality-of-service (QoS) characteristics associated with communication in the first and/or second communication mode and determining to communicate at least a first portion of a second communication in the second communication mode based on the QoS characteristic determination. For example and without limitation, step 517 may comprise determining that respective QoS requirements associated with the first and/or second communication modes are or are not being presently met. In such an example, step 517 may comprise determining to communicate at least a first portion of a second communication in the second communication mode to meet QoS requirements.

In another exemplary scenario, step 517 may comprise determining data rate characteristics associated with the first and/or second communications and with the first and/or second communication modes and determining to communicate at least a first portion of a second communication in the second communication mode based on the determined data rate characteristics. As a non-limiting example, step 517 may comprise determining that for an overall data rate goal to be met regarding the second communication, at least a first portion of the second communication should presently be communicated in the second communication mode. Also, for example, step 517 may comprise determining that since data rate goals are presently being exceeded for the first communication, temporarily switching away from the first communication to the second communication is appropriate.

In still another exemplary scenario, step 517 may comprise determining security characteristics associated with the first and/or second communications (e.g., respective security goals) or security characteristics associated with the first and/or second communication modes (e.g., respective security capabilities) and determining to communicate at least a first portion of a second communication based on the determined security characteristics. In a non-limiting example, step 517 may comprise determining that the security needs associated with the second communication (or a portion thereof) would be met by the second communication mode, and therefore determining to communicate at least a first portion of the second communication in the second communication mode.

In yet another exemplary scenario, step 517 may comprise determining communication range characteristics associated with the first and/or second communications (e.g., range needs) or with the first and/or second communication modes (e.g., respective range capabilities) and determining to communicate at least a first portion of the second communication in the second communication mode based on the range characteristics determination. As a non-limiting example, step 517 may comprise determining that the second communication range requirements would be satisfied by communicating in the second communication mode, and therefore determining to communicate at least a first portion of the second communication in the second communication mode. As another non-limiting example, step 517 may comprise determining that either of the first and second communication modes would satisfy the range requirements for the second communication but that, for some other reason, the second communication mode would be the most appropriate.

In an additional exemplary scenario, step 517 may comprise determining respective priorities associated with the first and/or second communications and determining to communicate at least a first portion of the second communication in the second communication mode based on the priority determination. In a non-limiting example, step 517 may comprise determining that the second communication is higher priority than the first communication, and therefore determining to presently communicate at least a first portion of the second communication in the second communication mode. Note that, as with all determination factors discussed above and below, priority may be combined with any one or more of the other factors when making the determination to communicate the second communication in the second communication mode.

In another exemplary scenario, step 517 may comprise determining monetary cost characteristics associated with the first and/or second communications or first and/or second communication modes and determining to communicate at least a first portion of the second communication in the second communication mode based on the cost determination. As a non-limiting example, step 517 may comprise determining that either of the first and second communication modes will effectively communicate the second communication but that the second communication mode is more monetarily cost effective than the first communication mode, and therefore determining to communicate at least a first portion of the second communication in the second communication mode.

As mentioned previously, any of the exemplary determination considerations discussed above may be combined for determining whether to presently communicate at least a first portion of the second communication in the second communication mode. As a non-limiting example, QoS, power availability and cost concerns may all be determined and considered when determining whether to communicate at least a first portion of the second communication in the second communication mode.

In general, step 517 may comprise determining to communicate a second communication in a second communication mode (e.g., in response to a real-time detected communication condition). Accordingly, the scope of various aspects of the present invention should not be limited by characteristics of any particular manner of making such determination.

The exemplary method 500 may, at step 520, comprise transmitting a first portion of the second communication in the second communication mode (e.g., in the same serial wireless transmission stream as step 510). Step 520 may comprise transmitting the first portion of the second communication in any of a variety of manners. Step 520 may, for example and without limitation, share any or all characteristics with steps 120 and 320 discussed previously.

The exemplary method 500 may, at step 527, comprise determining to communicate the first communication (e.g., a second portion of the first communication, a first portion of which was transmitted at step 510) in the first communication mode. Step 527 may, for example and without limitation, share any or all characteristics with step 517 discussed previously (albeit with regard to the first communication rather than the second communication).

The exemplary method 500 may, at step 530, comprise transmitting a second portion of the first communication in the first communication mode (e.g., in the same serial wireless transmission stream as steps 510 and 520). Step 530 may comprise transmitting the second portion of the first communication in any of a variety of manners. Step 530 may, for example and without limitation, share any or all characteristics with steps 130 and 330 discussed previously.

Figure 6:
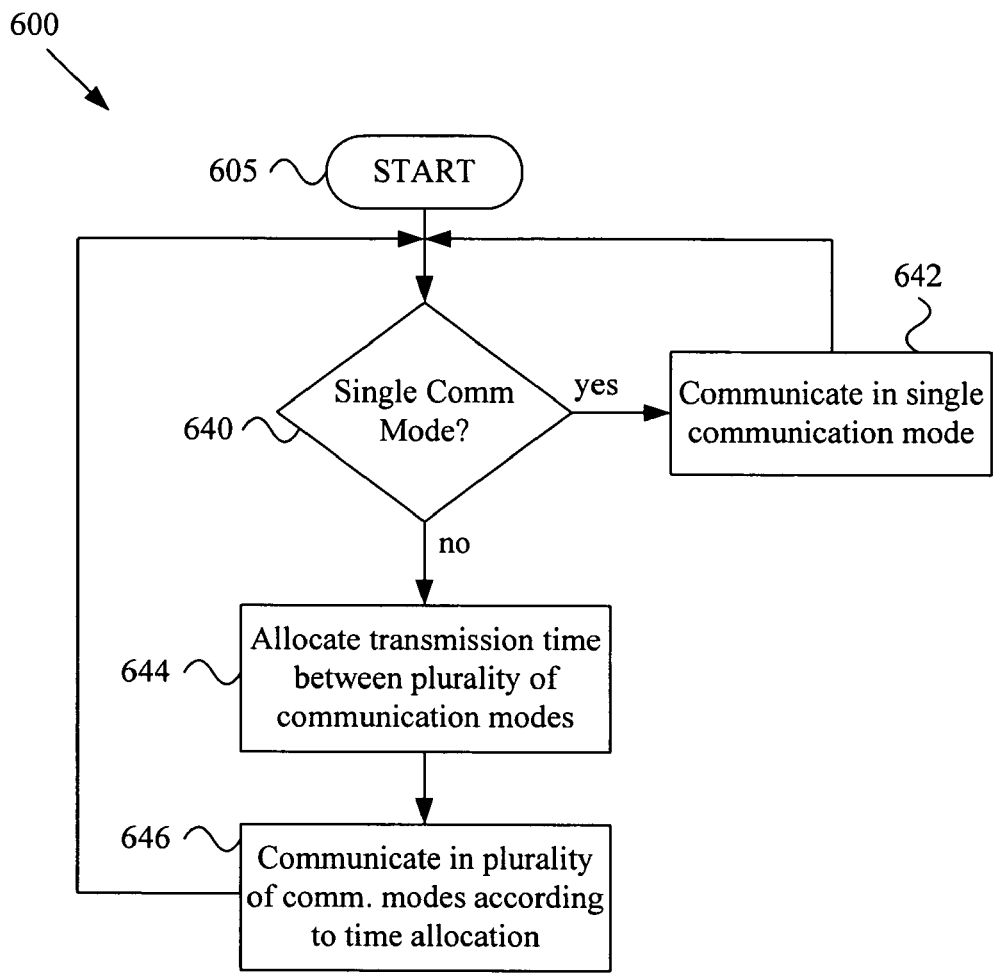
FIG. 6 is a diagram showing a fourth non-limiting exemplary method for providing concurrent multimode communication, in accordance with various aspects of the present invention.

FIG. 6 is a diagram showing a fourth non-limiting exemplary method 600 for providing concurrent multimode communication, in accordance with various aspects of the present invention. The exemplary method 600 may, for example and without limitation, share any or all characteristics with the exemplary methods 100, 300 and 500 illustrated in FIGS. 1, 3 and 5 and discussed previously.

The exemplary method 600 may, at step 640, comprise determining whether a plurality of communications are to occur concurrently (e.g., in a same serial wireless transmission stream) or whether a single communication is to occur. Step 640 may comprise determining whether a plurality of communications are to occur concurrently in any of a variety of manners. For example, step 640 may comprise determining that the user desires to perform the plurality of communications concurrently. Also for example, step 640 may comprise determining that present communication requirements (e.g., QoS, data rate, etc.) require that the first and second communications occur concurrently. Further for example, step 640 may comprise determining that the first and second communications are equally important or have a similar priority.

If it is determined at step 640 that a single communication is to occur, then step 640 may comprise directing execution flow of the exemplary method 600 to step 642. If it is determined at step 640 that a plurality of communications are to occur concurrently, then step 640 may comprise directing execution flow of the exemplary method to step 644.

The exemplary method 600 may, at step 642, comprise communicating in a single communication mode. Step 642 may comprise performing such communication in any of a variety of manners associated with communicating in a single communication mode.

The exemplary method 600 may, at step 644, comprise allocating transmission time between the plurality of communications (e.g., at least first and second communications). Such allocation may, for example, occur at the beginning of the plurality of communications, at the beginning of one of the plurality of communications, or in the middle of the plurality of communications, depending on the particular communication scenario. Step 644 may comprise allocating transmission time between the plurality of communications in any of a variety of manners, non-limiting examples of which will be provided below. For illustrative clarity, the following examples will generally discuss allocating transmission time between first and second communications. However, such examples are readily extensible to scenarios comprising more than two communications and more than two communication modes.

For example and without limitation, step 644 may comprise allocating transmission time between the plurality of communications (e.g., in respective first and second communication modes) based, at least in part, on any characteristics of the first and/or second communications or any characteristics associated with the first and/or second communication modes.

Also for example, step 644 may comprise allocating transmission time between the first and second communications (e.g., in respective first and second communication modes) based, at least in part, on quality-of-service (QoS) or other quality goals or constraints. As a non-limiting example, step 644 may comprise allocating a first amount of time (or first portion of a time window) for transmitting a first communication in a first communication mode, where the first amount of time is determined to be adequate for meeting QoS or other quality constraints associated with the first communication. Continuing the example, step 644 may also comprise allocating a second amount of time (or second portion of a time window) for transmitting a second communication in a second communication mode, where the second amount of time is determined to be adequate for meeting QoS or other quality constraints associated with the second communication.

Additionally for example, step 644 may comprise allocating transmission time between the first and second communications (e.g., in respective first and second communication modes) based, at least in part, on power consumption. As a non-limiting example, step 644 may comprise determining that communicating the first and/or second communications in first and/or second communication modes may be achieved in the most energy efficient manner by performing the first communication in the first communication mode for a first period of time (or first portion of a time window) and performing the second communication in the second communication mode for a second period of time (or second portion of a time window).

Further for example, step 644 may comprise allocating transmission time between the first and second communications (e.g., in respective first and second communication modes) based, at least in part, on monetary cost. As a non-limiting example, step 644 may comprise determining that communicating the first and/or second communications in first and/or second communication modes may be achieved in the most cost effective manner by performing the first communication in the first communication mode for a first period of time (or first portion of a time window) and performing the second communication in the second communication mode for a second period of time (or second portion of a time window).

Still further for example, step 644 may comprise allocating transmission time between the first and second communications (e.g., in respective first and second communication modes) based, at least in part, on carrier access requirements (e.g., listening or waiting times) associated with the first and/or second communication modes. As a non-limiting example, step 644 may comprise determining that communicating in the first communication mode effectively requires a first amount of time (or first portion of a time window) for carrier access and communicating in the second communication mode effectively requires a second amount of time (or second portion of a time window) for carrier access.

Also for example, step 644 may comprise allocating transmission time between the first and second communications (e.g., in respective first and second communication modes) based, at least in part, on message size requirements (e.g., packet or frame size) associated with the first and/or second communication modes. As a non-limiting example, step 644 may comprise determining that communicating in the first communication mode effectively requires a first amount of time (or first portion of a time window) for packet or frame transmission and communicating in the second communication mode effectively requires a second amount of time (or second portion of a time window) for packet or frame transmission.

Yet further for example, step 644 may comprise allocating transmission time between the first and second communications (e.g., in respective first and second communication modes) based, at least in part, on communication bandwidth needs or availability. As a non-limiting example, step 644 may comprise determining that communicating the first communication requires a first communication bandwidth, which is associated with communicating in the first communication mode for a first time period (or first portion of a time window), and determining that communicating the second communication requires a second communication bandwidth, which is associated with communicating in the second communication mode for a second time period (or second portion of a time window).

Also for example, step 644 may comprise allocating (or re-allocating) transmission time between the first and second communications (e.g., in respective first and second communication modes) based, at least in part, on real-time communication conditions. Various examples of such real-time communication conditions were discussed previously, including without limitation, noise, changing bandwidth requirements, changing power consumption and/or power supply parameters, changing range requirements, etc. In a scenario where step 644 comprises allocating transmission time, step 644 may also comprise re-allocating transmission time in accordance with changes in any of the variety of communication conditions (e.g., upon which a previous time allocation was determined).

Additionally for example, step 644 may comprise allocating transmission time between the first and second communications (e.g., in respective first and second communication modes) based, at least in part, on communication security needs or capability. As a non-limiting example, step 644 may comprise determining that particular levels of encryption associated with the first and/or second communication modes may require more or less communication bandwidth, which may then be considered in allocating transmission time. Also for example, step 644 may comprise determining that one of the first and/or second communication modes is more secure and allocating respectively more time to the more secure communication mode.

Further for example, step 644 may comprise allocating transmission time between the first and second communications (e.g., in respective first and second communication modes) based, at least in part, on communication range needs or availability. As a non-limiting example, step 644 may comprise determining that a first portion of communications (including the first communication) may be performed utilizing a first communication mode having an associated first communication range, and a second portion of communications (including the second communication) may be performed utilizing a second communication mode having an associated second communication range.

Note that a communication device implementing the exemplary method 600 may perform transmission time allocation independently or may communicate with other communication systems while performing such time allocation. For example and without limitation, step 644 may comprise communicating with respective communication systems corresponding to the first and second communication modes to determine various communication constraints. For example, step 644 may comprise communicating with the respective communication systems to determine timing constraints and/or available channels, timeslots or carriers. Step 646 may thus, comprise satisfying various communication constraints associated with each of the respective communication systems in a non-conflicting manner.

In general, step 644 may comprise allocating time between at least the first and second communications (e.g., in respective first and second communication modes) based on any one or more of a variety of criteria. Accordingly, the scope of various aspects of the present invention should not be limited by characteristics of any particular manner of performing such allocation or any particular criterion or criteria considered in performing such allocation.

The exemplary method 600 may, at step 646, comprise communicating in a plurality of communication modes (e.g., in a same serial wireless transmission stream) according to a time allocation (e.g., as determined at step 644).

The exemplary methods 100, 300, 500 and 600 illustrated in FIGS. 1, 3, 5 and 6, and discussed previously, were presented to provide non-limiting examples of various aspects of the present invention. Accordingly, the scope of various aspects of the present invention should not be limited by particular characteristics of the exemplary methods 100, 300, 500 and 600.

Figure 7:
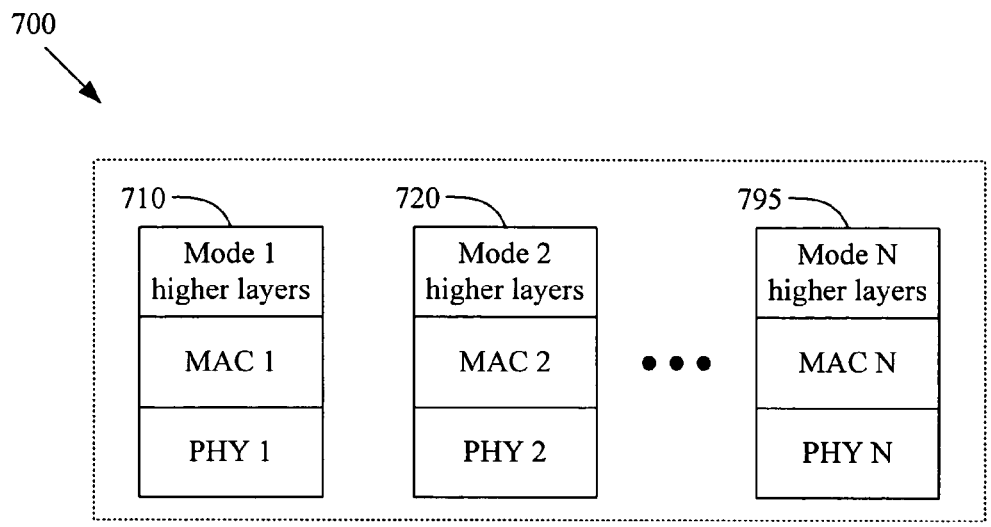
FIG. 7 is a diagram showing a portion of a first exemplary multimode communication system, in accordance with various aspects of the present invention.

FIG. 7 is a diagram showing a portion of a first exemplary multimode communication system 700, in accordance with various aspects of the present invention. As discussed previously, a communication system may comprise characteristics of any of a variety of communication systems/devices (e.g., fixed and/or mobile multimode communication devices). The exemplary communication system 700 may, for example and without limitation, be adapted to perform any or all of the functionality discussed previously with regard to the exemplary methods 100, 300, 500 and 600 discussed previously.

The following discussion may, at times, refer to implementation of particular functionality by one or more modules. Such modules may, for example, comprise various combinations of hardware and/or software. Also, the following discussion will illustrate and discuss various aspects of the present invention in terms of functional modules. Such manner of discussion was chosen for illustrative clarity and not limitation. For example, various functional modules may share various hardware and/or software components. Accordingly, the scope of various aspects of the present invention should not be limited by any particular module implementation or by any arbitrary boundaries between various modules.

The exemplary communication system 700 comprises hardware and/or software to perform communication in multiple communication modes. As an illustration of this, the exemplary communication system 700 comprises a plurality of communication protocol stacks associated with the plurality of communication modes. For example, the first protocol stack 710 may be adapted to perform communication in a first communication mode, the second protocol stack 720 may be adapted to perform communication in a second communication mode, and the $N^{th}$ protocol stack 795 may be adapted to perform communication in an $N^{th}$ communication mode.

As will be illustrated in later figures, the particular make-up of a communication stack may vary in accordance with the respective communication protocol (or mode) in which the communication stack is adapted to communicate. For example, the stack layer labels in FIG. 7 are, by no means, to be seen as limiting various aspects of the present invention to characteristics of protocol stacks having layers with such stack layer labels.

Also, as will be illustrated in later figures, various protocol stack layers may share various hardware and/or software components. For example, the graphical separation of the first 710, second 720 and $N^{th}$ 795 protocol stacks in FIG. 7 (and other figures) is for illustrative clarity and should not limit the scope of various aspects of the present invention to characteristics of such complete separation.

Figure 8:
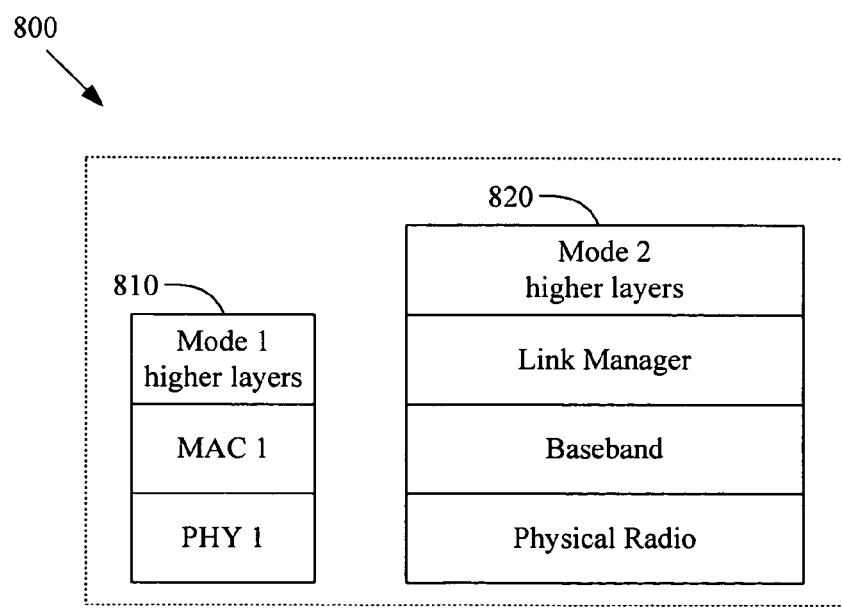
FIG. 8 is a diagram showing a portion of a second exemplary multimode communication system, in accordance with various aspects of the present invention.

FIG. 8 is a diagram showing a portion of a second exemplary multimode communication system 800, in accordance with various aspects of the present invention. The exemplary communication system 800 may share any or all characteristics with the exemplary communication system 700 of FIG. 7 and may share any or all functional characteristics with the exemplary methods 100, 300, 500 and 600 discussed previously.

The exemplary system 800 comprises a first protocol stack 810 adapted to communicate in a first communication mode and a second protocol stack 820 adapted to communicate in a second communication mode. For example and without limitation, the first protocol stack 810 may be associated with a first communication protocol (e.g., an IEEE 802.11 protocol), and the second protocol stack 820 may be associated with a second communication protocol (e.g., Bluetooth). As explained previously, the scope of various aspects of the present invention should not be limited by characteristics of a particular protocol stack.

Figure 9:
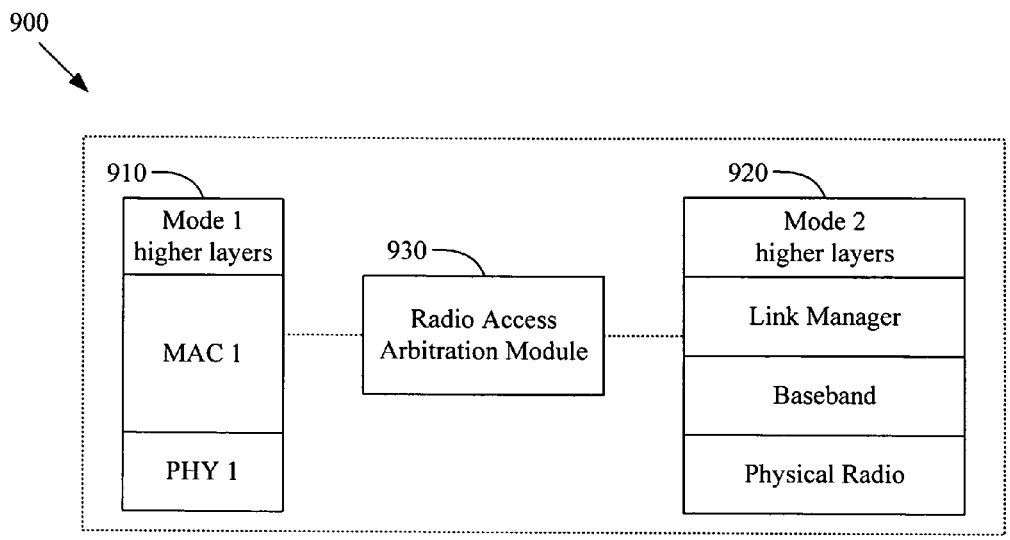
FIG. 9 is a diagram showing a portion of a third exemplary multimode communication system, in accordance with various aspects of the present invention.
Figure 10:
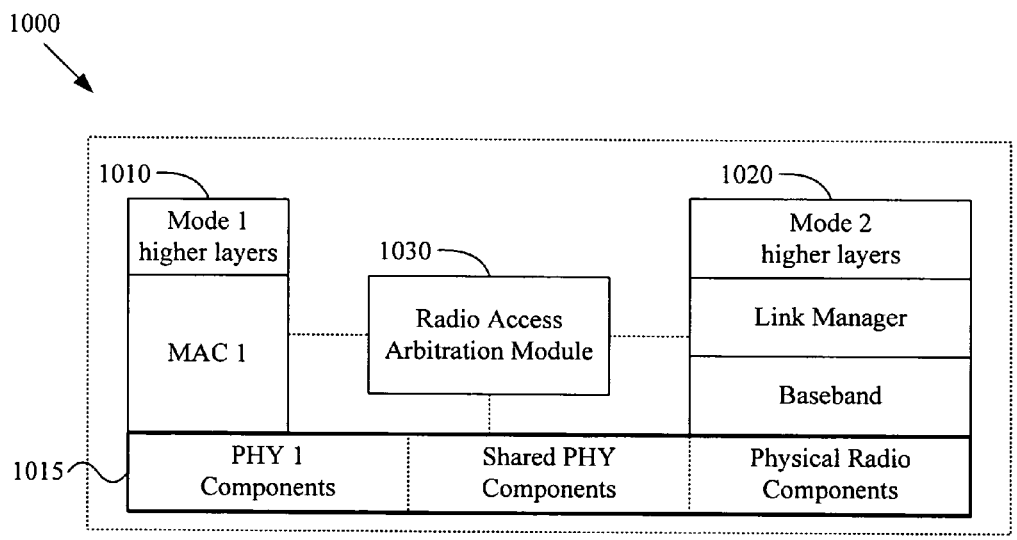
FIG. 10 is a diagram showing a portion of a fourth exemplary multimode communication system, in accordance with various aspects of the present invention.
Figure 11:
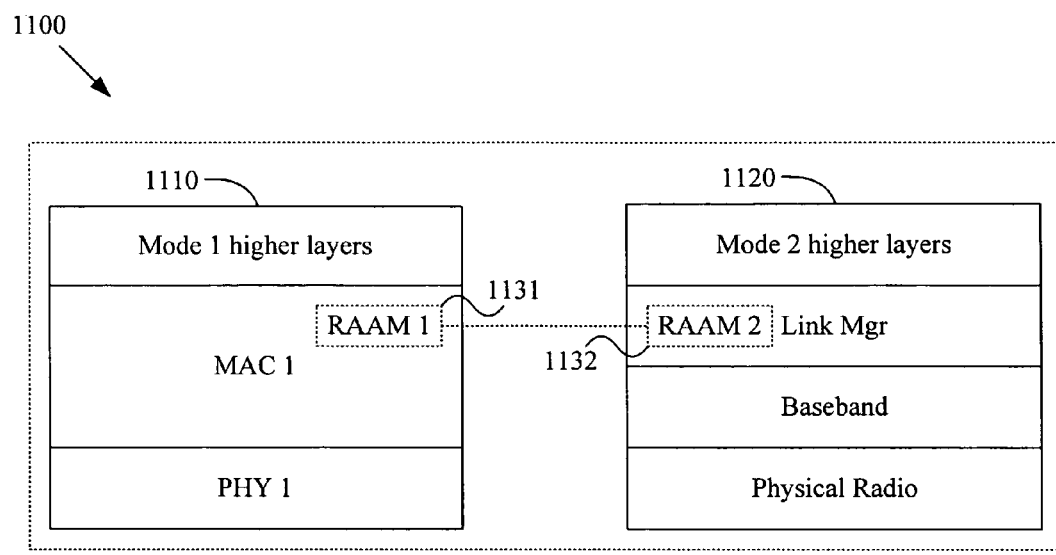
FIG. 11 is a diagram showing a portion of a fifth exemplary multimode communication system, in accordance with various aspects of the present invention.

The exemplary system 800 and the remaining systems 900-1100 illustrated in FIGS. 9-11 are illustrated with two protocol stacks. The two-stack model is shown and discussed for illustrative clarity and not limitation. For example, as illustrated in the exemplary system 700 of FIG. 7, various aspects of the present invention apply to communication systems comprising any number of protocol stacks.

FIG. 9 is a diagram showing a portion of a third exemplary multimode communication system 900, in accordance with various aspects of the present invention. The exemplary communication system 900 may share any or all characteristics with the exemplary communication systems 700-800 illustrated in FIGS. 7-8 and may share any or all functional characteristics with the exemplary methods 100, 300, 500 and 600 discussed previously.

The exemplary communication system 900 comprises a first protocol stack 910 adapted to communicate in a first communication mode and a second protocol stack 920 adapted to communicate in a second communication mode. For example and without limitation, the first protocol stack 910 may be associated with a first communication protocol (e.g., an IEEE 802.11 protocol), and the second protocol stack 920 may be associated with a second communication protocol (e.g., Bluetooth). As explained previously, the scope of various aspects of the present invention should not be limited by characteristics of a particular protocol stack.

The exemplary communication system 900 also comprises a radio access arbitration module 930 ("RAAM") that may, for example, be adapted to work in conjunction with the first protocol stack 910 and the second protocol stack 920 to manage concurrent communications through the protocol stacks 910, 920. The RAAM 930 (e.g., working in conjunction with the first and second protocol stacks 910, 920) may, for example and without limitation, be adapted to perform any or all of the functionality discussed previously with respect to the exemplary methods 100, 300, 500 and 600 illustrated in FIGS. 1, 3, 5 and 6 and discussed previously.

The RAAM 930 may, for example, be implemented in any of a variety of hardware and/or software configurations. For example, at least a portion of the RAAM 930 may be implemented with a processor executing software instructions and/or with application-specific integrated circuitry. Various functional aspects of the RAAM 930 and the first and second protocol stacks 910, 920 will now be illustrated by way of non-limiting example.

In a first non-limiting exemplary scenario, the RAAM 930 may be adapted to (e.g., during a first time period) direct transmission of a first portion of a first communication in a first communication mode (e.g., in a serial wireless transmission stream). The first communication may comprise characteristics of any of a variety of types of communications.

The RAAM 930 may be adapted to direct transmission of the first portion of the first communication in the first communication mode in any of a variety of manners. For example and without limitation, the RAAM 930 may be adapted to communicate with the first protocol stack 910 (e.g., the MAC layer or other layer) to direct communication of the first communication through the first protocol stack 910. The RAAM 930 may also, for example, be adapted to communicate with the second protocol stack 920 (e.g., the Link Manager layer or other layer) to temporarily stop communication through the second protocol stack 920.

Continuing the first non-limiting exemplary scenario, the RAAM 930 may be adapted to (e.g., during a second time period after the first time period) direct transmission of a first portion of a second communication in a second communication mode (e.g., in the same serial wireless transmission stream as the first portion of the first communication). As with the first communication, the second communication may comprise characteristics of any of a variety of types of communications. The second communication may, for example, be independent of the first communication. Alternatively for example, the second communication may correspond to a second portion of an aggregate communication, and the first communication may correspond to a first portion of the aggregate communication.

The RAAM 930 may be adapted to direct transmission of the first portion of the second communication in the second communication mode in any of a variety of manners. For example and without limitation, the RAAM 930 may be adapted to communicate with the second protocol stack 920 (e.g., the Link Manager layer or other layer) to direct communication of the second communication through the second protocol stack 920. The RAAM 930 may also, for example, be adapted to communicate with the first protocol stack 910 (e.g., the MAC layer or other layer) to temporarily stop communication through the first protocol stack 910 (e.g., stop communication of the first communication or other communication).

The first and second protocol stacks 910, 920 may be adapted to communicate information in any of a variety of manners. For example, the respective PHY layers of the first and second protocol stacks 910, 920 may be adapted to communication information in a wireless RF or optical manner. Note that the respective PHY layers may each comprise radio circuitry dedicated to communicating in their respective communication modes and may also comprise radio circuitry that is shared between both PHY layers. For example, the PHY layer of the first protocol stack 910 may utilize a first set of radio components to transmit in the first communication mode, and the PHY layer of the second protocol stack 920 may utilize a second set of radio components to transmit in the second communication mode, where at least a portion of the second set of radio components are in the first set of radio components.

Continuing the first non-limiting exemplary scenario, the RAAM 930 may be adapted to (e.g., during a third time period after the second time period) direct transmission of a second portion of the first communication in the first communication mode (e.g., in the same serial wireless transmission stream as the first portion of the first communication and the first portion of the second communication). The RAAM 930 may be adapted to direct transmission of the second portion of the first communication in the first communication mode in any of a variety of manners. For example and without limitation, the RAAM 930 may be adapted to communicate with the first protocol stack 910 (e.g., the MAC layer or other layer) to direct communication of the first communication (e.g., a second portion thereof) through the first protocol stack 910. The RAAM 930 may also, for example, be adapted to communicate with the second protocol stack 920 (e.g., the Link Manager layer or other layer) to temporarily stop communication through the second protocol stack 920 (e.g., stop communication of the second communication or other communication).

As mentioned previously, communication through the first and second protocol stacks 910, 920 may be performed in a plurality of communication modes utilizing at least shared PHY layer components (e.g., shared radio or various shared radio components). The exemplary communication system 1000 of FIG. 10 is presented to provide a non-limiting exemplary illustration of utilizing such a shared radio or shared radio components.

FIG. 10 is a diagram showing a portion of a fourth exemplary multimode communication system 1000, in accordance with various aspects of the present invention. The exemplary communication system 1000 may, for example and without limitation, share any or all characteristics with the exemplary communication systems 700-900 illustrated in FIGS. 7-9 and discussed previously and/or any or all functional characteristics of the exemplary methods 100, 300, 500 and 600 discussed previously.

The exemplary communication system 1000 may comprise a first protocol stack 1010 adapted to communicate in a first communication mode, a second protocol stack 1020 adapted to communicate in a second communication mode and a radio access arbitration module 1030 ("RAAM"). The first protocol stack 1010 may comprise PHY 1 layer components dedicated to communicating in the first communication mode, and the second protocol stack 1020 may comprise Physical Radio Components dedicated to communicating in the second communication mode. The first protocol stack 1010 and the second protocol stack 1020 may also share Shared PHY Components, which may, for example, be configurable (e.g, programmable) to be utilized for communication in either of the first and second communication modes. Various functional aspects of the RAAM 1030 and the first and second protocol stacks 1010, 1020 will now be presented by way of non-limiting example.

In a second non-limiting exemplary scenario, the RAAM 1030 may be adapted to prepare the Shared PHY components (e.g., various radio components) of the communication system 1000 for communicating in the first communication mode. For example, the RAAM 1030 may comprise directing a programmable radio and/or shared radio components to change configuration to a configuration corresponding to communicating in the first communication mode.

The RAAM 1030 may also, for example, be adapted to prepare a PHY layer (e.g., a radio) of the communication system 1000 by, at least in part, waking sleeping components of the communication system 1000 that are associated with communicating in the first communication mode (e.g., the PHY 1 components). The RAAM 1030 may additionally, for example, be adapted to place one or more components of the communication system 1000 (e.g., components associated with a previous communication mode different from the first communication mode) in a sleep state.

The RAAM 1030 (or other module of the system 1000) may then be adapted to wait a transient time period (e.g, after programming the programmable PHY components or directing the programmable PHY components to change configuration). Such waiting may, for example, ensure that various switching and other devices (e.g., filters, frequency generators, codecs, etc.) have stabilized or converged to the desired state before utilizing the PHY components.

Continuing the second non-limiting exemplary scenario, the RAAM 1030 may then be adapted to (e.g., during a first time period) direct transmission of a first portion of a first communication in a first communication mode (e.g., in a serial wireless transmission stream). As discussed previously with regard to the RAAM 930 of FIG. 9, the RAAM 1030 may be adapted to direct transmission of the first portion of the first communication in the first communication mode in any of a variety of manners. For example and without limitation, the RAAM 1030 may be adapted to communicate with the first protocol stack 1010 (e.g., the MAC layer or other layer) to direct communication of the first communication through the first protocol stack 1010. The RAAM 1030 may also, for example, be adapted to communicate with the second protocol stack 1020 (e.g., the Link Manager layer or other layer) to temporarily stop communication through the second protocol stack 1020.

Continuing the second non-limiting exemplary scenario, the RAAM 1030 may be adapted to prepare the Shared PHY components (e.g., various radio components) of the communication system 1000 for communicating in the second communication mode. For example, the RAAM 1030 may comprise directing a programmable radio and/or shared radio components to change configuration to a configuration corresponding to communicating in the second communication mode.

The RAAM 1030 may also, for example, be adapted to prepare a PHY layer (e.g., a radio) of the communication system 1000 by, at least in part, waking sleeping components of the communication system 1000 that are associated with communicating in the second communication mode. The RAAM 1030 may additionally, for example, be adapted to place one or more components of the communication system 1000 (e.g., components associated with the first communication mode and not the second communication mode) in a sleep state.

The RAAM 1030 (or other module of the system 1000) may then be adapted to wait a transient time period (e.g., after programming the programmable PHY components or directing the programmable PHY components to change configuration). Such waiting may, for example, ensure that various switching and other devices (e.g., filters, frequency generators, codecs, etc.) have stabilized or converged to the desired state before utilizing the PHY components. The transient time period may, for example, be the same transient time period associated with the first communication mode or may be different (e.g., depending on settling or convergence characteristics).

Continuing the second non-limiting exemplary scenario, the RAAM 1030 may then be adapted to (e.g., during a second time period) direct transmission of a first portion of a second communication in a second communication mode (e.g., in the same serial wireless transmission stream as the first portion of the first communication). As discussed previously with regard to the RAAM 930 of FIG. 9, the RAAM 1030 may be adapted to direct transmission of the first portion of the second communication in the second communication mode in any of a variety of manners. For example and without limitation, the RAAM 1030 may be adapted to communicate with the second protocol stack 1020 (e.g., the Link Manager layer or other layer) to direct communication of the second communication through the second protocol stack 1020. The RAAM 1030 may also, for example, be adapted to communicate with the first protocol stack 1010 (e.g., the MAC layer or other layer) to temporarily stop communication through the second protocol stack 1010 (e.g., at least temporarily stop communicating the first communication).

Continuing the second non-limiting exemplary scenario, the RAAM 1030 may be adapted to repeat the process discussed previously for switching back to communication of the first communication in the first communication mode (e.g., in the same serial wireless transmission stream as the first portion of the first communication and the first portion of the second communication). For example, the RAAM 1030 may be adapted to interact with the first protocol stack 1010 and the second protocol stack 1020 to at least temporarily stop transmission of the second communication in the second communication mode and resume transmission of the first communication in the first communication mode.

Each of the exemplary scenarios discussed thus far have comprised switching between communicating the first communication in the first communication mode and communicating the second communication in the second communication mode. Such switching may result from a RAAM determining to perform such a switch. A RAAM may perform such a switch in response to any of a variety of conditions. For example, a RAAM may determine to switch communications (and/or communication modes) in response to a detected condition or event or in accordance with a predetermined transmission time allocation. The next two exemplary scenarios provide non-limiting illustrations of such switching determination.

In a third non-limiting exemplary scenario, the RAAM 1030 may be adapted to (e.g., during a first time period) direct transmission of a first portion of a first communication in a first communication mode (e.g., in a serial wireless transmission stream). Examples of such transmission were discussed previously.

The RAAM 1030 (or other module) may then be adapted to determine to communicate a second communication in a second communication mode (e.g., in the same serial wireless transmission stream as the first communication). The RAAM 1030 may, for example, be adapted to determine to communicate the second communication concurrently with the first communication. The RAAM 1030 may be adapted to make such determination(s) in response to any of a variety of events or conditions. For example and without limitation, the RAAM 1030 may share any or all functional characteristics with step 517 of the exemplary method 500 illustrated in FIG. 5 and discussed previously.

For example and without limitation, the RAAM 1030 may be adapted to determine to switch between transmitting the first communication and second communication in response to: a received signal, timer expiration, network availability, carrier availability, geographical location, noise conditions, power consumption and/or supply, QoS requirements, data rate, security, range, communication priority, monetary cost, any combination of considerations, etc. Accordingly, the scope of various aspects of the present invention should not be limited by characteristics of any particular manner of, or mechanism for, making such a determination.

Continuing the third non-limiting exemplary scenario, the RAAM 1030 may be adapted to, after determining to switch to communicating the second communication in the second communication mode, direct transmission of a first portion of the second communication in the second communication mode (e.g., in the same serial wireless transmission stream as the first communication). Examples of such transmission were discussed previously.

The RAAM 1030 may then be adapted to determine to communicate the first communication in the first communication mode, or another communication in another communication mode, (e.g., in the same serial wireless transmission stream as the second communication). The RAAM 1030 may be adapted to make such determination in response to any of a variety of events or conditions, examples of which were provided previously.

In a fourth non-limiting exemplary scenario, the RAAM 1030 (or other module) may be adapted to determine to concurrently perform a plurality of communications in a plurality of respective communication modes (e.g., a first communication in a first communication mode in a first serial wireless transmission stream and a second communication in a second communication mode in the first serial wireless transmission stream). The RAAM 1030 may be adapted to make such a determination in any of a variety of manners. For example and without limitation, the RAAM 1030 may be adapted to determine that the user desires to perform the first and second communications concurrently. Also for example, the RAAM 1030 may be adapted to determine that present communication requirements (e.g., QoS, data rate, etc.) require that the first and second communications occur concurrently. Further for example, the RAAM 1030 may be adapted to determine that the first and second communications are equally important or have a similar priority.

The RAAM 1030 may then be adapted to allocate transmission time between first and second communications (e.g., in a same serial wireless transmission stream). Such allocation may, for example, occur at the beginning of the first and second communications, at the beginning of one of the first and second communications, or in the middle of both first and second communications, depending on the particular communication scenario. The RAAM 1030 may be adapted to allocate transmission time between the first and second communications in any of a variety of manners. For example and without limitation, the RAAM 1030 may share any or all functional characteristics with step 644 of the exemplary method 600 illustrated in FIG. 6 and discussed previously.

For example and without limitation, the RAAM 1030 may be adapted to allocate transmission time between a plurality of communications based, at least in part on: communication mode characteristics, QoS or other quality goals or constraints, power consumption and/or supply, monetary cost, network availability, carrier accessibility, communication type, message or frame or packet size, communication bandwidth needs and/or availability, security needs and/or capabilities, communication range, any combination of considerations, etc. The scope of various aspects of the present invention should not be limited by any particular manner of, or mechanism for, allocating transmission time between a plurality of communications and/or communication modes.

Further for example, the RAAM 1030 may be adapted to allocate (or re-allocate) transmission time between a plurality of communications and/or communication modes based on various real-time communication conditions, some of which were discussed previously. Such real-time communication conditions may, for example, comprise without limitation: noise, changing bandwidth requirements, changing power consumption and/or supply parameters, changing range requirements, etc. In an example where the RAAM 1030 is adapted to allocate transmission time, the RAAM 1030 may also be adapted to re-allocate transmission time in accordance with changes in any of the variety of communication conditions (e.g., upon which a previous time allocation was determined).

Continuing the fourth non-limiting exemplary scenario, the RAAM 1030 may then be adapted to direct the concurrent transmission of a plurality of communications in a plurality of respective communication modes (e.g., in a same serial wireless transmission stream) according to the determined transmission time allocation.

As mentioned previously, various functional modules are illustrated and discussed as independent entities for illustrative clarity and not for limitation. For example, the RAAMs 930, 1030 discussed previously may be implemented as part of any one or more protocol stacks. FIG. 11 provides non-limiting examples of various implementation options. FIG. 11 is a diagram showing a portion of a fifth exemplary multimode communication system 1100, in accordance with various aspects of the present invention.

The exemplary communication system 1100 may, for example, comprise a first protocol stack 1110 and a second protocol stack 1120. In a first non-limiting exemplary configuration, the RAAM may be implemented exclusively in the first protocol stack 1110 (e.g., illustrated by RAAM 1 1131). In a second non-limiting exemplary configuration, the RAAM may be implemented exclusively in the second protocol stack 1120 (e.g., as illustrated by RAAM 2 1132). In a third non-limiting exemplary configuration, the RAAM may be implemented in a distributed manner in the first and second protocol stacks 1110, 1120 (e.g., as illustrated by RAAM 1 1131 in combination with RAAM 2 1132). In such a distributed configuration the distributed RAAM modules may comprise a master RAAM and slave RAAM(s), or the distributed RAAM modules may be generally equivalent and guided by decision rules that ensure effective transmission coordination.

The exemplary communication systems 700-1100 illustrated in FIGS. 7-11 were presented to provide non-limiting examples of various aspects of the present invention. Accordingly, the scope of various aspects of the present invention should not be limited by particular characteristics of the exemplary communication systems 700-1100.

In summary, various aspects of the present invention provide a system and method providing concurrent multimode communication through multimode signal multiplexing. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a multimode communication system, a method for communicating information, the method comprising:
    during a first time period, transmitting a first portion of a first communication in a first communication mode in a serial wireless transmission stream;
    during a second time period after the first time period, transmitting a first portion of a second communication in a second communication mode in the serial wireless transmission stream; and
    during a third time period after the second time period, transmitting a second portion of the first communication in the first communication mode in the serial wireless transmission stream.

2. The method of claim 1, wherein:
    transmitting in a first communication mode comprises utilizing a first set of radio components; and
    transmitting in a second communication mode comprises utilizing a second set of radio components, wherein at least a portion of the second set of radio components is identical to at least a portion of the first set of radio components.

3. The method of claim 1, further comprising prior to transmitting the first portion of the second communication, configuring a programmable radio to transmit in the second communication mode.

4. The method of claim 1, further comprising, prior to transmitting the first portion of the second communication:
    directing a programmable radio to change configuration to a configuration corresponding to communications in the second communication mode; and
    waiting a transient time period, after directing the programmable radio, before transmitting the first portion of the second communication.

5. The method of claim 1, further comprising, prior to transmitting the first portion of the second communication, waking one or more electrical components associated with communicating in the second communication mode.

6. The method of claim 1, further comprising, prior to transmitting the first portion of the first communication and the first portion of the second communication, allocating transmission time between the first and second communications.

7. The method of claim 6, wherein allocating transmission time between the first and second communications comprises allocating transmission time between the first and second communications based, at least in part, on quality of service.

8. The method of claim 6, wherein allocating transmission time between the first and second communications comprises allocating transmission time between the first and second communications based, at least in part, on characteristics of the first and second communication modes.

9. The method of claim 6, wherein allocating transmission time between the first and second communications comprises allocating transmission time between the first and second communications based, at least in part, on data rate.

10. The method of claim 6, wherein allocating transmission time between the first and second communications comprises allocating transmission time between the first and second communications based, at least in part, on carrier access requirements associated with transmitting in the first and second communication modes.

11. The method of claim 6, wherein allocating transmission time between the first and second communications comprises allocating transmission time between the first and second communications based, at least in part, on communication priority.

12. The method of claim 1, further comprising prior to transmitting the first portion of the second communication:
    detecting a communication condition; and
    determining to transmit the first portion of the second communication in response to the detected communication condition.

13. The method of claim 1, further comprising, prior to transmitting the first portion of the second communication:
    detecting expiration of a timer; and
    determining to transmit the first portion of the second communication in response to the detected timer expiration.

14. The method of claim 1, further comprising, prior to transmitting the first portion of the second communication, detecting availability of a communication network associated with the second communication mode.

15. The method of claim 1, further comprising, prior to transmitting the first portion of the second communication, detecting that a carrier associated with communicating in the second communication mode is available.

16. The method of claim 1, further comprising, prior to transmitting the first portion of the second communication, receiving a signal from a communication network associated with the second communication mode.

17. The method of claim 1, further comprising, prior to transmitting the first portion of the second communication, determining that quality of service (QoS) concerns favor communicating the second communication over communicating the first communication.

18. The method of claim 1, further comprising, prior to transmitting the first portion of the second communication, determining that the second communication has a higher priority than the first communication.

19. The method of claim 1, further comprising, prior to transmitting the first portion of the second communication, determining that communication of the second communication should occur concurrently with communication of the first communication.

20. The method of claim 1, wherein the first communication and the second communication represent portions of a single aggregate communication.

21. The method of claim 1, wherein the first time period has a different duration than the third time period.

22. A multimode communication system comprising at least one module adapted to:
during a first time period, transmit a first portion of a first communication in a first communication mode in a serial wireless transmission stream;
during a second time period after the first time period, transmit a first portion of a second communication in a second communication mode in the serial wireless transmission stream; and
during a third time period after the second time period, transmit a second portion of the first communication in the first communication mode in the serial wireless transmission stream.

23. The multimode communication system of claim 22, wherein the at least one module is adapted to:
transmit in a first communication mode by utilizing a first set of radio components; and
transmit in a second communication mode by utilizing a second set of radio components, wherein at least a portion of the second set of radio components is identical to at least a portion of the first set of radio components.

24. The multimode communication system of claim 22, wherein the at least one module is adapted to, prior to transmitting the first portion of the second communication, configure a programmable radio to transmit in the second communication mode.

25. The multimode communication system of claim 22, wherein the at least one module is adapted to, prior to transmitting the first portion of the first communication and the first portion of the second communication, allocate transmission time between the first and second communications.

26. The multimode communication system of claim 25, wherein the at least one module is adapted to allocate transmission time between the first and second communications based, at least in part, on quality-of-service.

27. The multimode communication system of claim 25, wherein the at least one module is adapted to allocate transmission time between the first and second communications based, at least in part, on communication priority.

28. The multimode communication system of claim 22, wherein the at least one module is adapted to, prior to transmitting the first portion of the second communication:
detect a communication condition; and
determine to transmit the first portion of the second communication in response to the detected communication condition.

29. The multimode communication system of claim 22, wherein the at least one module is adapted to, prior to transmitting the first portion of the second communication:
detect expiration of a timer; and
determine to transmit the first portion of the second communication in response to the detected timer expiration.

30. The multimode communication system of claim 22, wherein the at least one module is adapted to, prior to transmitting the first portion of the second communication, detect that a carrier associated with communicating in the second communication mode is available.

31. The multimode communication system of claim 22, wherein the at least one module is adapted to, prior to transmitting the first portion of the second communication, receive a signal from a communication network associated with the second communication mode.

32. The multimode communication system of claim 22, wherein the at least one module is adapted to, prior to transmitting the first portion of the second communication, determine that quality of service (QoS) concerns favor communicating the second communication over communicating the first communication.

33. The multimode communication system of claim 22, wherein the at least one module is adapted to, prior to transmitting the first portion of the second communication, determine that the second communication has a higher priority than the first communication.

34. The multimode communication system of claim 22, wherein the first time period has a different duration than the third time period.

* * * * *